Nov. 1, 1966 E. A. FERRIS 3,281,922

METHOD FOR ASSEMBLY OF SEMICONDUCTOR DEVICES

Filed Oct. 24, 1963 2 Sheets-Sheet 1

ERNIE A. FERRIS,
INVENTOR.

BY HIS ATTORNEYS

Spensley & Horn

METHOD FOR ASSEMBLY OF SEMICONDUCTOR DEVICES

Filed Oct. 24, 1963 2 Sheets-Sheet 2

ERNIE A. FERRIS,
INVENTOR.

BY HIS ATTORNEYS
Spensley & Horn

United States Patent Office 3,281,922

Patented Nov. 1, 1966

3,281,922

METHOD FOR ASSEMBLY OF SEMICONDUCTOR DEVICES

Ernie A. Ferris, Westminster, Calif., assignor to TRW Semiconductors, Inc., Lawndale, Calif., a corporation of Delaware Filed Oct. 24, 1963, Ser. No. 318,597
6 Claims. (Cl. 29—155.5)

This invention relates to an improved method and apparatus for assembly of semiconductor devices, and more particularly to the packaging thereof in an encapsulating, hermetically sealed envelope.

In the manufacture of certain electrical devices, it is especially important to house the electrical element forming the heart of the device in a hermetically sealed envelope. For example, semiconductor devices are commonly encapsulated in a hermetically sealed envelope to ensure consistent operation and long life. Various types of encapsulating structures have been designed to protect the semiconductive material from chemical contamination, to provide good thermal dissipation, shock and vibration resistance, and ease of connection.

It has long been recognized in the semiconductor art that the mounting of a semiconductor device within a miniaturized cylindrical housing having a central region composed of a glass tube, affords a foundation for designing an ideal hermetically sealed package. One such package is described and claimed in U.S. Patent No. 2,815,474, entitled "Glass Sealed Semiconductor Rectifier," issued December 3, 1957, to William M. Lewis, Jr. et al. This particular package includes a central glass cylinder to which is sealed a pair of tubular metal shells at opposite ends thereof. The resulting assembly is called a fused body subassembly. Such fused body subassemblies are commonly formed by fusing the metal shells to opposite ends of the glass cylinder by means of a fusion machine utilizing radio-frequency energy to supply the necessary heat. Metal connecting pin or electrodes are inserted into the metal shells at the opposite ends of the glass cylinder. At the inner end of one pin is welded a resilient whisker element while the semiconductor device is ohmically bonded to the inner end of the other pin. When the pins are inserted into the shells, the free end of the resilient whisker element contacts the top surface of the semiconductor device to complete the connection. Thereafter the shells are bonded by welding to their respective pins to complete the fabrication.

This type of fabrication is quite satisfactory for the packaging of semiconductor devices, such as diffusion or alloy-type diodes wherein substantially all of the top surface thereof is of a material that exhibits one type of conductivity. Where, however, this surface is covered except for a very small exposed opening, such as with a planar diode for example, there is great difficulty in establishing contact therein with the whisker element. It is to the solution of this difficulty in the assembly of semiconductor devices that the present invention is directed.

It has been found that instead of placing the whisker element on the end of the electrode that does not have the semiconductor device thereon, such electrode being hereinafter called the "dummy pin," and then inserting the dummy pin having the whisker element bonded thereto into the housing for mating of the whisker element with the exposed opening in the top surface of the semiconductor device, the whisker element may be bonded to the semiconductor device through the exposed opening first and thereafter the whisker element may be mated to the end of the dummy pin. In the practice of the present invention, the whisker is connected at one end to the dummy pin and at the other end to the semiconductor device mounted on a second pin, sometimes hereinafter called the "crystal pin." Thereafter the fused body subassembly is positioned thereover for final assembly and welded to the dummy pin and to the crystal pin.

It is therefore an object of the present invention to provide for an improved method and apparatus for the assembly of semiconductor devices.

Another object of the invention is the provision of a more reliable method of establishing contact between the surface of a semiconductor device within a housing and an outwardly projecting contact pin through positive contact therebetween with a whisker element.

A further object is the provision of an improved planar diode package assembly method.

Still another object of the present invention is to provide a semiconductor package of low cost and high reliability.

Yet another object of the present invention is to provide a semiconductor package having the ability to withstand mechanical shock and vibration.

The novel features that are believed to be characteristic of the present invention, together with other objects and advantages thereof, will be better understood from the following description, considered in connection with the accompanying drawings.

Figure 1:
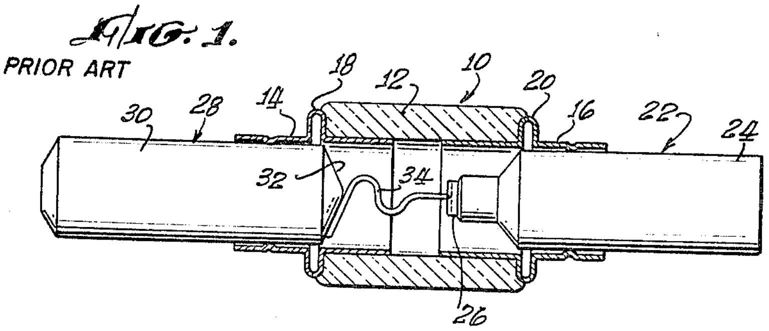
FIG. 1. PRIOR ART
FIGURE 1 is a partial cross-sectional view of a prior art package.

Reference is now made to the prior art package shown in FIGURE 1 wherein the semiconductor device is of the diffusion or alloy type, having a substantially unitary inner or top surface of a single conductivity type of material. In the final assembly of this package, there are three main subassembles. The first is a tube and glass envelope assembly 10 consisting of an annular insulator member 12 and tube members 14 and 16, respectively. The opposite ends of the insulator 12 are in register with the bumps 18 and 20 of the tubes 14 and 16. The inner ends of the tubes are sealed to the insulator in a manner well known in the art.

The second subassembly 22 consists of a crystal pin 24 adapted to fit within the tube 16. On the inner end of this pin is ohmically bonded a semi-conductor device 26. This device may be, for example, a diode having a diffused region of the opposite conductivity type from that of the body proper, resulting in a PN junction. A region of one conductivity type is in contact with the pin 24 and the other region forms the outer layer of the semiconductor device.

The third subassembly 28 consists of a second or dummy pin 30 adapted to be received within tube 14. Welded on its inner surface 32 is a resilient whisker element 34. In the final assembly, pins 30 and 24 are inserted in the tubes 14 and 16 and when whisker element 34 is mated with the semiconductor element 26, the tubes are welded to the pins and the assembly is complete.

This type of semiconductor package is more fully described in the earlier-mentioned patent and, as previously stated, is quite satisfactory when whisker contact may be made at any point on the surface of the semiconductor.

In making contact, however, with a very small preselected portion of the semiconductor surface, such as in the packaging of a planar diode for example, the resiliency of the whisker and the difficulty of its critical placement on surface 32 of pin 30 makes contact practically impossible, even with use of precision instruments and when assembled under a microscope.

Figure 2:
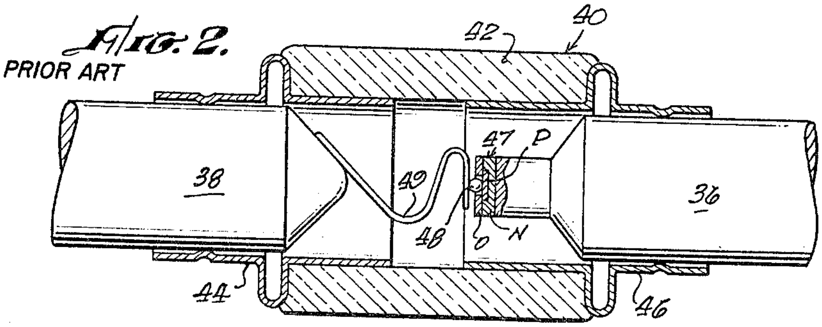
FIG. 2. PRIOR ART
FIGURES 2 and 3 are partial cross-sectional views of other packages.

The embodiment shown in FIGURE 2 represents an attempt at solving the problem of attaching a whisker to a very small front surface contact area, such as is available on a planar diode for example. In this embodiment pins 36, 38 and housing subassembly 40, consisting of annular insulator member 42 and connecting tube members 44, 46, are substantially identical to their counterparts in the embodiment shown in FIGURE 1. The semiconductor device, however, is of the planar diode type having a portion of an N type conductivity and part of its top surface having a P type conductivity material diffused therein. A metalized ohmic contact surface has been provided in a manner known in the semiconductor art. Except for a very small opening over a part of the P type area on the order of 5 mils, the top surface is covered with an insulating cover of oxide O. Within this opening is placed a small metallic ball 48 of one of the noble metals, such as gold for example. Instead of the whisker 34 in FIGURE 1, a flat resilient ribbon 49 is mounted on the end of pin 38. The housing subassembly 40 bonded to one of the pins 36, 38 serves as a guide in establishing contact between ribbon 49 and ball 48. When properly mated, the subassembly 40 is then bonded to the other of pins 36, 38 to complete the assembly. Any misalignment or any deformation of ribbon 49 or loss of ball 48 due to vibration causes an open circuit. Under vibrational conditions, the ball 48 sometimes becomes separated from its opening in diode 47 since ball 48 rests within the opening and is not bonded to the ribbon 49 or to the exposed surface of diode 47. Moreover, ball 48 makes point contact with the diode surface and thus may become a source of noise and additional contact resistance.

Figure 3:
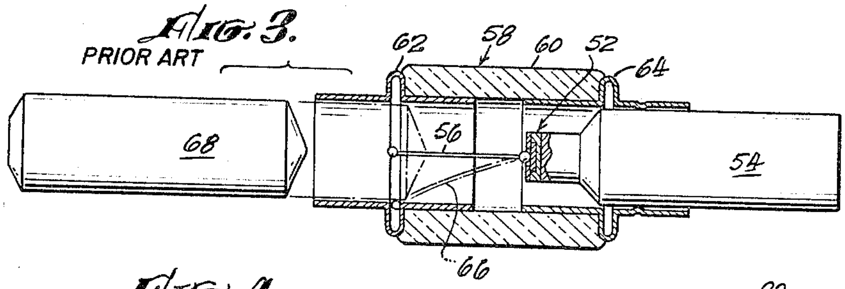
FIG. 3. PRIOR ART

Reference is now had to FIGURE 3 wherein is shown another solution to the problem. In this instance, the semiconductor component 52, such as a planar diode, is positioned on the inner end of electrode 54 in the conventional manner. In this embodiment, whisker element 56 is first bonded to the opening in the top surface of the semiconductor. Subassembly 58 consisting of annular insulator member 60 with bumped tubes 62, 64 at each end is next inserted over the whisker element 56 and the semiconductor device 52 and bonded to electrode 54, in the position shown in the drawing. When this step has been completed, whisker element 56 is next moved into contact with tube 62, as shown at dotted line 66, and welded. The last step in the assembly is to insert electrode 68 into bumped tube 62 and weld it thereto. The bumped tube 62 thus forms an intermediate connection between pin 68 and whisker element 56.

Figure 4:
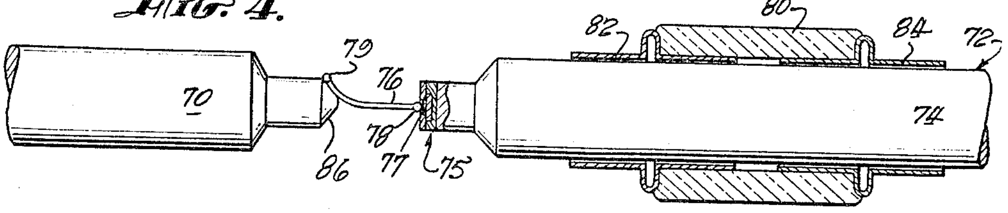
FIGURE 4 is a partial sectional view of a semiconductor package, partially assembled in accordance with the present invention.

Having thus described other attempts at solving applicant's problem of conveniently and reliably positioning the whisker element between a selected area on the front of a semiconductor bonded to a first electrode pin and attaching the other end of the whisker element to a second electrode, reference is now had to FIGURE 4 wherein there is shown an intermediate stage of applicant's method of assembly.

Here there is shown a first subassembly consisting of dummy electrode pin 70, a second subassembly 72 consisting of crystal electrode pin 74, a semiconductor element 75, such as a planar diode for example, and whisker element 76 bonded to the exposed surface 77 on the semiconductor element 75. This exposed surface preferably is a silver contact plated over a metalized surface P to which contact with whisker element 76 is desired. An oxide coating used in the plating of the silver remains to prevent bonding of the whisker element elsewhere on the diode surface. Since the exposed surface is on the order of 5 mils diameter and the whisker element is a gold wire on the order of 2 mils in diameter, this assembly is performed under a microscope. This wire is of gold or other nonresilient malleable metal, the end of which forms a ball 78 when exposed to heat. Hence ball 78 may be formed by cutting the wire with heat. This end 78 of wire 76 is then welded under suitable heat and compression to the exposed surface 77 of diode 75 with a commercially available device known as a nailhead bonder. After welding this end of the gold wire to the exposed surface, the wire is cut to a length of about 75 mils. Cutting of end 79 of the wire is preferably done with heat so that this end of the wire also forms a ball for greater contact surface.

A third subassembly consists of annular insulator member 80 with bumped tubes 82, 84 bonded at each end thereof in the conventional manner. In final assembly, this third subassembly is next positioned over electrode pin 74 and slidably positioned away from its inner end with diode 75 thereon. The next step is to position whisker element 76 in contact with the inner end 86 of dummy pin 70 and make a bonding connection therebetween, such as by welding. This stage of completion is shown in FIGURE 4.

Figure 5:
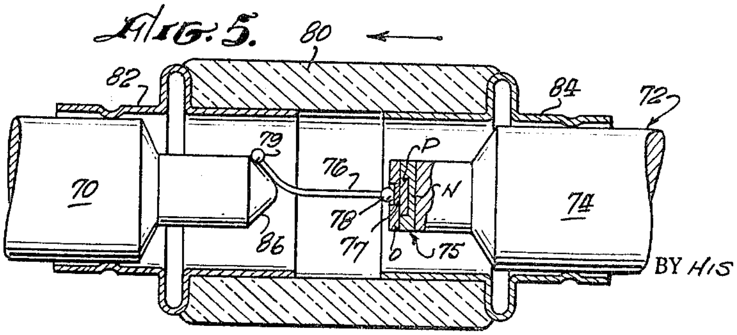
FIGURE 5 is a partial sectional view showing the completed semiconductor package.

The final steps of applicant's assembly method are apparent when reference is had to FIGURE 5. Here the third subassembly is then slidably positioned over the inner ends of both electrode pins 70 and 74 and bonded thereto to hermetically seal the envelope thus formed for the semiconductor element 75. While this third assembly is known as a bumped tube body and is used for purposes of explaining the present invention, it is to be understood that other types of housing assemblies may be used, if desired. The housing assembly may also be positioned over dummy pin 70 instead of over crystal pin 74 before welding whisker 76 to pin 70, if desired.

Figure 6:
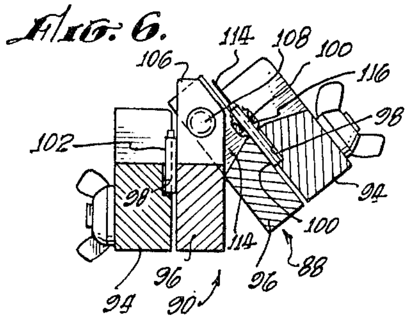
FIGURES 6 and 8 are sectional views of a jig used in the assembly of the semiconductor device.
Figure 7:
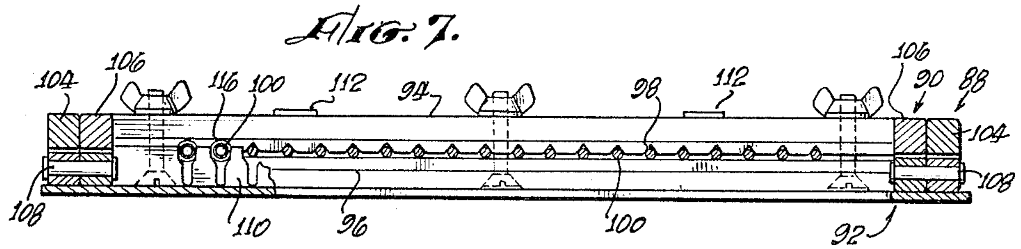
FIGURE 7 is a sectional view, taken along the line 7—7 of FIGURE 8.
Figure 8:
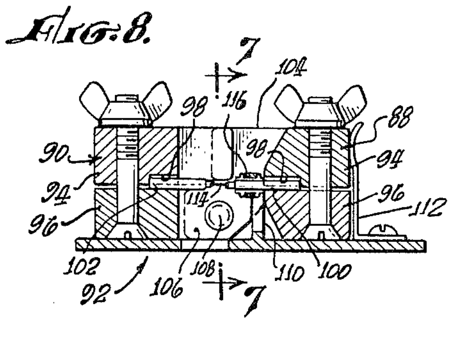

Because whisker element 78 is quite delicate and because the parts are quite small and difficult to handle, a unique fixture has been designed to handle these subassemblies in their assembly. One such fixture is shown in FIGURES 6, 7, and 8. This fixture consists of two clamps 88, 90 and support plate 92. Clamps 88 and 90 each consist of two clamping plates 94, 96 with a plurality of pin-retaining openings 98 therebetween. Pins 100, having the semiconductor element thereon, are positioned in one row of openings and dummy pins 102 or pins without the semiconductor element thereon are positioned in the other openings. These openings have an inner abutting portion which limits or positions the pins. Ears 104, 106 are provided at each end of the clamps and are pivotally connected, such as by pin 108, so that the two clamps may be moved from the "open" position shown in FIGURE 6 to the "closed" position shown in FIGURE 8. A front view of one of the clamps is shown in FIGURE 7. Plates 94, 96 may be tightened or loosened relative to each other to accommodate various sizes of pins. The housing subassembly is inserted over one of the aligned pins, for convenience shown as pin 100 in FIGURE 6.

When the clamps are pivoted into alignment, as shown in FIGURE 8, clamp 90 is then positioned on base 92 between projection 110 and a spring clip 112. Clamp 80 simply rests on the base 92. It should be noted that the pivot point 108 is such that the inner edge of the pin 102 is positioned under whisker element 114 and in immediate position for bonding therebetween. After the bonding operation, the housing subassembly 116 is positioned over the whisker element and tack-welded to the inner ends of the two pins. Thereafter the completed assembly may be removed from the fixture and hermetically welded as the final step.

Having thus described the preferred method and apparatus for the assembly of semiconductor devices, the advantages of this invention can be appreciated. Among them are that the location of both pins relative to each other may be established within a high degree of accuracy, and that it is possible to inspect each successive step of the assembly operation carefully after completion thereof and prior to the performance of the next step in the sequence. The method and fixtures involved allow a maximum access to the parts and thus the best possible electrical circuit can be established. Since better control is provided and since inspection is possible after every step, a much better product can be produced more economically and with greater reliability.

While the preferred embodiment has thus been described, it is to be understood that various modifications will become apparent and that such modifications are intended to be within the scope of the invention as defined in the appended claims.

What is claimed is:

1. The method of assembling a semiconductor device comprising the steps of:
   conductively securing a semiconductor body to the end face of a crystal pin;
   bonding one end of a whisker element to a preselected position on the surface of said semiconductor body;
   coaxially aligning a dummy pin with said crystal pin adjacent the other end of said whisker element;
   bonding the other end of said whisker element to the end of said dummy pin;
   slidably positioning a cylindrical housing over the adjacent ends of both pins, said whisker element and said semiconductor body; and
   thereafter hermetically sealing said housing to both of said pins.

2. The method of assembly of a semiconductor device as claimed in claim 1, wherein said cylindrical housing is positioned over said dummy pin before said whisker element is bonded thereto and thereafter said housing is slidably positioned over the ends of both said pins.

3. The method of assembly of a semiconductor device as in claim 1, wherein said cylindrical housing is positioned over said crystal pin before bonding said whisker element to said dummy pin and thereafter said housing is slidably positioned over the ends of both said pins.

4. The method of assembly of a semiconductor device as in claim 1, wherein the cylindrical housing is positioned over one of said pins before the whisker element is bonded to said semiconductor body.

5. The method of assembly of a semiconductor device as in claim 1, wherein said cylindrical housing is postioned over one of said pins after said whisker element has been bonded to said semiconductor body.

6. A method of assembling a semiconductor device including a planar diode mounted on the end of a crystal pin comprising the steps of:
   conductively securing a semiconductor crystal body to the end face of a crystal pin;
   nailhead bonding one end of a whisker element to a preselected position on the surface of said crystal body;
   coaxially aligning a dummy pin with said crystal pin adjacent the other end of said whisker element;
   welding the other end of said whisker element to the end of said dummy pin;
   positioning a cylindrical housing over the ends of both pins, said whisker element, and said diode; and
   thereafter welding said housing to both of said pins.

References Cited by the Examiner

UNITED STATES PATENTS

| | | | |
|---|---|---|---|
| 2,584,297 | 2/1952 | Schmuldt | 29—203 |
| 2,801,603 | 8/1957 | Reichelt | 29—203 |
| 2,815,474 | 12/1957 | Lewis | 317—236 |
| 3,134,058 | 5/1964 | Walkow | 317—234 |
| 3,176,382 | 4/1965 | Dickson | 29—155.5 |
| 3,181,229 | 5/1965 | Haberecht | 29—155.5 |

CHARLIE T. MOON, *Primary Examiner.*

WHITMORE A. WILTZ, *Examiner.*

W. I. BROOKS, *Assistant Examiner.*